3,297,752
ALKYLATION OF UREA
Thomas F. Rutledge, Wilmington, Del., assignor to Atlas Chemical Industries, Inc., Wilmington, Del., a corporation of Delaware
No Drawing. Filed June 30, 1965, Ser. No. 468,556
14 Claims. (Cl. 260—553)

This invention relates to an improved process for preparing N-t-alkyl urea and N,N'-di-t-alkyl urea.

It is known that urea can be reacted with tertiary olefins in the presence of sulfuric acid to yield a mixture of N-t-alkyl urea and N,N'-di-t-alkyl urea. It has also been proposed to control the temperature of the reaction by carrying out the alkylation reaction in the presence of n-butane, n-pentane, n-hexane, or certain perfluorinated hydrocarbons (United States Patent No. 2,548,585).

It has now been discovered, quite unexpectedly, that the process for alkylating urea with a tertiary olefin in the presence of sulfuric acid can be improved by carrying out the alkylating reaction in the presence of an inert diluent selected from the group consisting of cyclohexane, dichloromethane, and mixtures thereof. More specifically, the process of the present invention comprises reacting a mono-olefin containing a tertiary olefinic carbon atom with urea contained in a mixture of urea, sulfuric acid, and an inert diluent selected from the group consisting of cyclohexane, dichloromethane, and mixtures thereof, said mixture containing between about 1.5 to about 2.5 mols of sulfuric acid per mol of urea and said sulfuric acid having a concentration of from about 90 to about 96 weight percent.

In the absence of a diluent or in the presence of a diluent shown in the prior art, such as n-hexane, the reaction mixture is quite viscous and efficient stirring is impossible, especially in the case of large reaction mixtures normally used in the plant, whereas when the inert diluents of the present invention are used, efficient stirring is easily achieved. The improved stirring obtained by using the inert diluents of the present invention permits better control of reaction conditions, reproduceability of results, and the use of larger size reaction mixtures. Thus, the added cost of using these diluents is easily justified.

Another advantage in using the inert diluents of the present invention is that when the ratio of mols of sulfuric acid per mol of urea is between about 1.7 to about 2.5, preferably between about 1.75 and about 2.0, and the concentration of the sulfuric acid used is between about 90 to about 96 weight percent, the inert diluents of the present invention have a directive effect on the course of the reaction; namely, the formation of the expected N,N'-di-t-alkyl urea is substantially decreased and the formation of N-t-alkyl urea is substantially increased. It is completely unexpected that the said diluents would have a directive effect on the course of the reaction and it is not known at the present time how the said diluents increase the proportion of N-t-alkyl urea relative to the N,N'-di-t-alkyl urea produced in the alkylation of urea with tertiary olefin. It is known, however, that any substantial departure from the indicated concentrations and amounts of sulfuric acid will lessen the directive effect of the inert diluents of the present invention. Olefins for alkylating urea in accordance with the present invention are those tertiary mono-olefins in which carbon atoms alpha and beta to the tertiary olefinic carbon atom are either primary or secondary, that is, unhindered olefins which conform to the formula

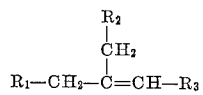

where $R_1$, $R_2$, and $R_3$ are independently selected from the group consisting of —H, —CH$_3$, —CH$_2$CH$_3$, and —CH$_2$R$_4$, R$_4$ being alkyl. Such olefins include, for example, isobutylene, 2-methyl-1-pentene, 2 - methyl - 2 - butene, 2-methyl-1-butene, 2-methyl-2-pentene, 3-methyl-2-pentene, 2-methyl-1-hexene, 2-methyl-2-hexene, and the like. The preferred unhindered tertiary mono-olefins are isobutylene and 2-methyl-1-pentene. The amount of olefin used is not critical. However, sufficient olefin should be used to obtain substantial nitrogen utilization and the production of desirable yields of N-t-alkyl urea. The olefin:urea ratio is desirably at least about 1 and preferably at least about 2. Any unreacted olefin is easily recovered and recycled.

The amount of inert diluent used is not critical. However, it is preferable that the inert diluent comprise at least about one-half, by volume, of the reaction mixture in order to insure efficient stirring.

The reaction is conveniently carried out by mixing together the urea, sulfuric acid, and inert diluent. The temperature is then adjusted to between about 5° C. and about 30° C. Next the tertiary olefin is added, either as a liquid or as a gas, and thoroughly intermingled with the reaction mass by agitation. The tertiary olefin is preferably added gradually at about the rate at which it is consumed by the alkylation reaction since the tertiary olefins tend to oligomerize under the reaction conditions. Generally, a reaction time of 0.5–4 hours will suffice. The reaction conditions are terminated and the alkylated urea recovered by any suitable means from the reaction mass. A preferred method of recovering N-t-alkyl urea from the reaction mass comprises diluting the reaction mixture with a small amount of water which is insufficient to precipitate the alkylated urea, separating the aqueous layer from the inert diluent layer, neutralizing the aqueous layer with an inorganic base whereupon N-t-alkyl urea and any N,N'-di-t-alkyl urea formed precipitates. The precipitated alkyl urea is removed by filtration and, if further purification is desired, extracted with an aqueous solution of ethyl alcohol.

With the foregoing general discussion in mind, there is given herewith examples illustrative of the present invention and a number of its preferred embodiments. It is understood, of course, that many further variations and modifications of the present invention may be made by those skilled in the art without departing from the scope and spirit of the present invention, which is defined in the appended claims. Numbered examples are in accordance with the present invention, those designated by letter are inserted for purposes of comparison.

The following procedure was employed in Examples 1–3. Five mols of urea were added to 2100 milliliters of inert diluent and the sulfuric acid added at 10–15° C. over a period of 15–20 minutes. The charge was allowed to warm to 20–25° C. while stirring for 45 minutes after the sulfuric acid was added. The charge was cooled to about 10° C. and ten mols of isobutylene added through a dip tube under the surface over the period of time indicated while gradually raising the temperature to 28–30° C. The charge was stirred for 15 minutes after the isobutylene was added and the reaction terminated. The N-t-butyl urea and N,N'-di-t-butyl urea were recovered by the following procedure. Water was added to the reaction mixture and the aqueous layer separated. The aqueous layer was neutralized to a pH of 8–9 with ammonium hydroxide to precipitate the N-t-butyl urea and N,N'-di-t-butyl urea. The precipitate was removed by filtration and extracted with hot aqueous ethyl alcohol. The insoluble N,N'-di-t-butyl urea was removed by filtration and the filtrate cooled to precipitate N-t-butyl urea.

| Example No. | 1 | 2 | 3 |
|---|---|---|---|
| Charge: | | | |
| Mol Ratio H$_2$SO$_4$/Urea | 1.75 | 2.0 | 2.0 |
| Percent Concentration H$_2$SO$_4$ | 92 | 92 | 91 |
| Diluent | (1) | (2) | (3) |
| Reaction Conditions: | | | |
| Time, hours | 2.5 | 2.5 | 3.0 |
| T° C | 10–30 | 10–28 | 10–29 |
| Recovery: | | | |
| Dilution water, grams | 573 | 655 | 665 |
| Neutralization, 29% NH$_3$, grams | 1,068 | 1,247 | 1,186 |
| Extraction water, ml | 4,420 | 2,530 | 1,400 |
| 3A denatured Ethyl alcohol, ml | 595 | 650 | 400 |
| Product, Percent Theory Based on Urea: | | | |
| Mono | 79.4 | 62.5 | 66 |
| Di | 2.4 | 1.8 | 3 |

1 Cyclohexane.
2 Dichloromethane.

The following procedure was used in the following examples. 0.5 mols of urea was placed in a 500 ml. creased Morton flask and 200 milliliters of inert diluent added. The mixture was cooled to 10° C. and the sulfuric acid added to the stirred mixture over a period of 15 minutes at 10–20° C. The mixture was stirred for 45 minutes, during which time the temperature rose to 30° C. The mixture was cooled to 5–10° C. and 1.2 mols of isobutylene added at a rate of 9 liters per hour for three hours. The temperature was held at 5–10° C. At the end of the indicated time, the isobutylene addition was stopped and the stirring continued for 15 minutes to consume excess dissolved olefin. The alkylated urea was recovered according to the following procedure. 50 milliliters of water was added and the aqueous layer separated from the inert diluent layer. The aqueous layer was neutralized with ammonium hydroxide to a pH of about 9 to precipitate the N-t-alkyl urea and N,N'-di-t-alkyl urea. The precipitated solid was removed, air dried, and treated with a boiling mixture of 85 ml. ethanol and 400 ml. of water. The insoluble N,N'-di-t-butyl urea was removed by filtration and the filtrate cooled to precipitate the N-t-butyl urea which was removed by filtration.

| Example No. | Charge | | | Percent Theory Based on Urea | |
|---|---|---|---|---|---|
| | H$_2$SO$_4$/urea mols | H$_2$SO$_4$ Concentration, percent | Diluent | Mono | Di |
| 4 | 2.0 | 93 | Cyclohexane | 80 | 0 |
| 5 | 1.7 | 96 | do | 60 | 2.6 |
| 6 | 2.0 | 96 | do | 66 | 12 |
| 7 [1] | 2.0 | 93 | do | 60 | 0 |
| 8 | 1.5 | 96 | do | 44 | 25 |
| 9 | 2.0 | 90 | do | 63 | 0 |

1 2-methyl pentene-1 was substituted for the isobutylene.

*Example A*

Example 9 was repeated under identical conditions except that n-hexane was substituted for the cyclohexane. The product contained 37 percent N-t-butyl urea and 17 percent N,N'-di-t-butyl urea, percent of theory based on urea charged.

Thus, it is readily apparent by comparing the results of Examples 9 and A that the use of cyclohexane instead of n-hexane, increased the yield of N-t-butyl urea from 37% to 63% and decreased the yield of N,N'-di-t-butyl urea from 17% to zero.

The process of the present invention gives excellent yields, and is readily manageable, since the reaction mixture remains reasonably fluid. The process can be carried out without difficulty, in simple equipment, and with only a minimum of skilled attendance.

What is claimed is:
1. The process of preparing N-t-alkyl urea which comprises reacting a mono-olefin, containing a tertiary olefinic carbon atom with urea contained in a mixture of urea, sulfuric acid, and an inert diluent selected from the group consisting of cyclohexane, dichloromethane, and mixtures thereof, said mixture containing between about 1.5 to about 2.5 mols of sulfuric acid per mol of urea and said sulfuric acid having a concentration of from about 90 to about 96 weight percent.
2. The process of claim 1 wherein at least about 2 mols of mono-olefin per mol of urea is employed.
3. The process of claim 1 wherein the reaction is effected at a temperature between about 5° C. and about 30° C.
4. The process of claim 1 wherein the inert diluent comprises at least half of the reaction mixture.
5. The process of claim 1 wherein the inert diluent is cyclohexane.
6. The process of claim 1 wherein the inert diluent is dichloromethane.
7. The process of claim 1 wherein the inert diluent is a mixture of cyclohexane and methylene dichloride.
8. The process of claim 1 wherein the mono-olefin containing a tertiary olefinic carbon atom is isobutylene.
9. The process of preparing N-t-alkyl urea which comprises reacting an unhindered mono-olefin containing a tertiary olefinic carbon atom with urea in the presence of about 1.7 to about 2.5 mols of sulfuric acid per mol of urea, said sulfuric acid having a concentration of from about 90 to about 96 weight percent, and in the presence of an inert diluent selected from the group consisting of cyclohexane, dichloromethane, and mixtures thereof.
10. The process of claim 9 wherein the unhindered mono-olefin containing a tertiary carbon atom is isobutylene.
11. The process of claim 10 wherein about 2 mols of mono-olefin per mol of urea is employed.
12. The process of claim 10 wherein the inert diluent comprises at least half of the reaction mixture.
13. The process of claim 12 wherein the reaction is effected at a temperature between about 5° C. and about 30° C.
14. The process of preparing N-t-butyl urea which comprises reacting isobutylene with urea, at a temperature between about 5° C. and about 30° C., in the presence of about 1.75 mols of sulfuric acid per mol of urea, said sulfuric acid having a concentration of about 92 weight percent, and in the presence of an inert diluent selected from the group consisting of cyclohexane, dichloromethane, and mixtures thereof, said inert diluent comprising at least half of the reaction mixture.

References Cited by the Examiner
UNITED STATES PATENTS
2,548,585    4/1951    Brown ------------- 260—553

ALEX MAZEL, *Primary Examiner.*
J. H. TURNIPSEED, *Assistant Examiner.*